United States Patent
Mizutani et al.

(10) Patent No.: US 8,253,965 B2
(45) Date of Patent: Aug. 28, 2012

(54) IMAGE FORMING APPARATUS

(75) Inventors: Norio Mizutani, Mie-ken (JP); Kousuke Fukaya, Chiryu (JP); Naoki Hashimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1225 days.

(21) Appl. No.: 12/026,061

(22) Filed: Feb. 5, 2008

(65) Prior Publication Data

US 2008/0297848 A1    Dec. 4, 2008

(30) Foreign Application Priority Data

Feb. 15, 2007    (JP) .................................. 2007-035135

(51) Int. Cl.
*G06K 15/00*    (2006.01)
(52) U.S. Cl. ....... 358/1.16; 358/1.15; 358/401; 358/402
(58) Field of Classification Search ................ 358/1.16, 358/1.15, 401, 402
See application file for complete search history.

(56) References Cited

U.S. PATENT DOCUMENTS

| | | | | |
|---|---|---|---|---|
| 4,829,453 A * | 5/1989 | Katsuta et al. | ................ | 382/305 |
| 5,649,188 A * | 7/1997 | Nomura et al. | ....................... | 1/1 |
| 5,685,003 A * | 11/1997 | Peltonen et al. | ............... | 715/202 |
| 6,178,420 B1 * | 1/2001 | Sassano | ................................. | 1/1 |
| 6,442,540 B2 * | 8/2002 | Sako et al. | ............................. | 1/1 |
| 7,236,968 B2 * | 6/2007 | Seki et al. | ............................... | 1/1 |
| 7,721,214 B2 * | 5/2010 | Dowling | ........................ | 715/738 |
| 7,747,943 B2 * | 6/2010 | Bargeron et al. | ............. | 715/235 |
| 2002/0057463 A1 * | 5/2002 | Kanazawa | .................... | 358/437 |
| 2004/0122811 A1 * | 6/2004 | Page | .................................. | 707/3 |
| 2006/0271588 A1 * | 11/2006 | Tanaka | .......................... | 707/102 |
| 2007/0070416 A1 | 3/2007 | Nakamura | | |

FOREIGN PATENT DOCUMENTS

| | | |
|---|---|---|
| JP | 7-085239 A | 3/1995 |
| JP | 2001-088374 | 4/2001 |
| JP | 2006-086646 | 3/2006 |
| JP | 2006-168206 | 6/2006 |
| JP | 2006-227773 A | 8/2006 |
| JP | 2006-228009 A | 8/2006 |

OTHER PUBLICATIONS

JP Office Action dtd Jan. 13, 2009, JP App 2007-035135, partial English Translation.

* cited by examiner

*Primary Examiner* — King Poon
*Assistant Examiner* — Allen H Nguyen
(74) *Attorney, Agent, or Firm* — Banner & Witcoff, Ltd.

(57) ABSTRACT

An image forming apparatus is provided. The image forming apparatus includes an input unit which inputs a keyword; a preparation unit which prepares list data relating to a print file containing the keyword among a plurality of print files stored in a storage unit; and a printing unit that prints a list based on the list data.

8 Claims, 6 Drawing Sheets

IMAGE FORMING APPARATUS

CROSS-REFERENCE TO RELATED APPLICATION

This application claims priority from Japanese Patent Application No. 2007-035135, filed on Feb. 15, 2007, the entire subject matter of which is incorporated herein by reference.

TECHNICAL FIELD

Aspects of the present invention relate to an image forming apparatus having a keyword search function.

BACKGROUND

JP-A-2006-86646 describes a related art image forming apparatus having a keyword search function which searches a storage device storing document data read by a scanner, by a keyword input with an operation panel. When document data matching a search conditions has found, the found document is printed out.

SUMMARY

However, in the related art image forming apparatus described in JP-2006-86646, when a document data matching a search condition based on an input keyword is found, the found document data is printed out without confirmation of the content of the document data by a user.

Therefore, in the related art image forming apparatus, document data different from the document data desired by a user may be printed out, which causes additional consumption of recording media such as recording sheets.

Moreover, the related art image forming apparatus prints document data stored only in an internal storage device in the related art image forming apparatus based on a keyword search result. The related art image forming apparatus does not have a direct printing function by which document data or other data stored in an external storage device not installed in the image forming apparatus may be printed directly without using a computer or others.

Exemplary embodiments of the present invention address the above disadvantages and other disadvantages not described above. However, the present invention is not required to overcome the disadvantages described above, and thus, an exemplary embodiment of the present invention may not overcome any of the problems described above.

According to an aspect of the present invention, an image forming apparatus includes an input unit which inputs a keyword; a preparation unit which prepares list data relating to a print file containing the keyword among a plurality of print files stored in a storage unit; and a printing unit that prints a list based on the list data.

According to another aspect of the present invention, an image forming apparatus includes an input unit which inputs a keyword; a terminal to which a storage unit is removably coupled; and a first print unit which prints a print file containing the keyword among a plurality of print files stored in the storage unit.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

Exemplary embodiments of the present invention will now be discussed with reference to the accompanying drawings.

1. Brief Exemplary Configuration of Image Forming Apparatus

Figure 1:
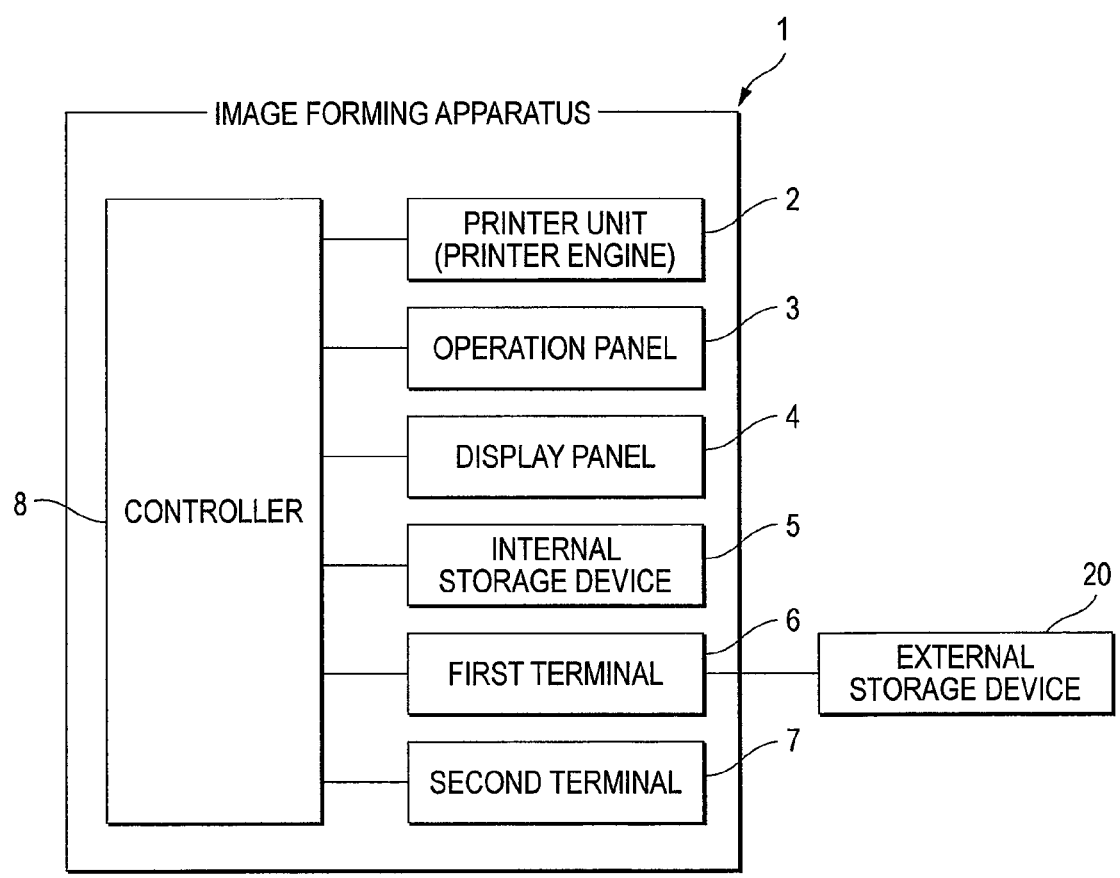
FIG. 1 is a block diagram showing a brief configuration of an image forming apparatus according to an exemplary embodiment of the present invention.

FIG. 1 is a block diagram showing a brief configuration of an image forming apparatus according to an exemplary embodiment of the present invention. As shown in FIG. 1, an image forming apparatus 1 includes a printer unit (i.e. a printer engine) 2, an operation panel 3, a display panel 4, an internal storage device 5, a first terminal 6, a second terminal 7 and a controller 8. The first terminal is coupled to an external storage device 20. Within the image forming apparatus 1, the controller 8 is coupled to the printer 2, the operation panel 3, the display panel, the internal storage device 5, the first terminal 6, and the second terminal 7.

The printer unit 2 prints an image on a recording medium such as a recording sheet. The operation panel 3 receives the setting and/or input. The setting and/or input may be provided by a user. The display panel 4 displays various types of information.

It is noted that the display panel 4 comprises a so-called touch panel, in which a part of the display panel 4 is touched with a finger or a pen or similar device. In other words, data may be input to the image forming apparatus 1 by either a user or a manual or automatic input device. By touching the panel, additional functionality is provided, for example, functionality to accept an input relating to the display content displayed at the touched site.

The internal storage device 5 stores image data to be printed by the printer unit 2, or print files and other data stored at an external storage device 20 coupled to the first terminal 6 to be described in more detail later. The internal storage device 5 keeps information being stored even when power supplied to a flash memory, a hard disk drive (HDD) or other such external storage device is stopped.

It is noted that the print file may include, for example, document data prepared by application software for a word processor, etc., or data that has been converted from document data into a format usable in the image forming apparatus 1.

The first terminal 6 is a connection unit, to which an external storage device 20 capable of storing electronic data such as print files, is removably attached. It is noted that any terminal, which may serve as an interface capable of connecting the external storage device 20 with the image forming apparatus 1, can be used as the first terminal 6. In this exemplary embodiment, a terminal (interface) based on the Universal Serial Bus (USB) specification is adopted as the first terminal 6.

Any external storage device, which has an interface which can be connected to the first terminal 6, can be used as the external storage device 20. Specifically, the external storage device 20 may include non-volatile semiconductor storage devices such as a flash memory, which is so called a USB memory, or a SD memory (registered trademark), or magnetic storage devices such as an HDD.

The second terminal 7 connects a computer (not shown) with the image forming apparatus 1. In this exemplary embodiment, an interface for directly connecting the computer with the image forming apparatus 1 and an interface for connecting them via a network such as Ethernet (registered trademark) are employed as the second terminal 7.

The controller 8 comprises a micro computer including a CPU, ROM, RAM and others. The controller 8 controls operations of the printer unit 2, the operation panel, the display panel 4, the internal storage device 5, the first terminal 6, and the second terminal 7, along with any other devices in accordance with programs stored at a storage device such as a ROM.

The image forming apparatus further comprises a casing (not shown) to accommodate the printer unit 2, the operation panel 3, the display panel 4, the internal storage device 5, the first terminal 6, the second terminal 7, the controller 8 and any other device.

2. Functions of the Image Forming Apparatus for the Exemplary Embodiment

Figure 2:
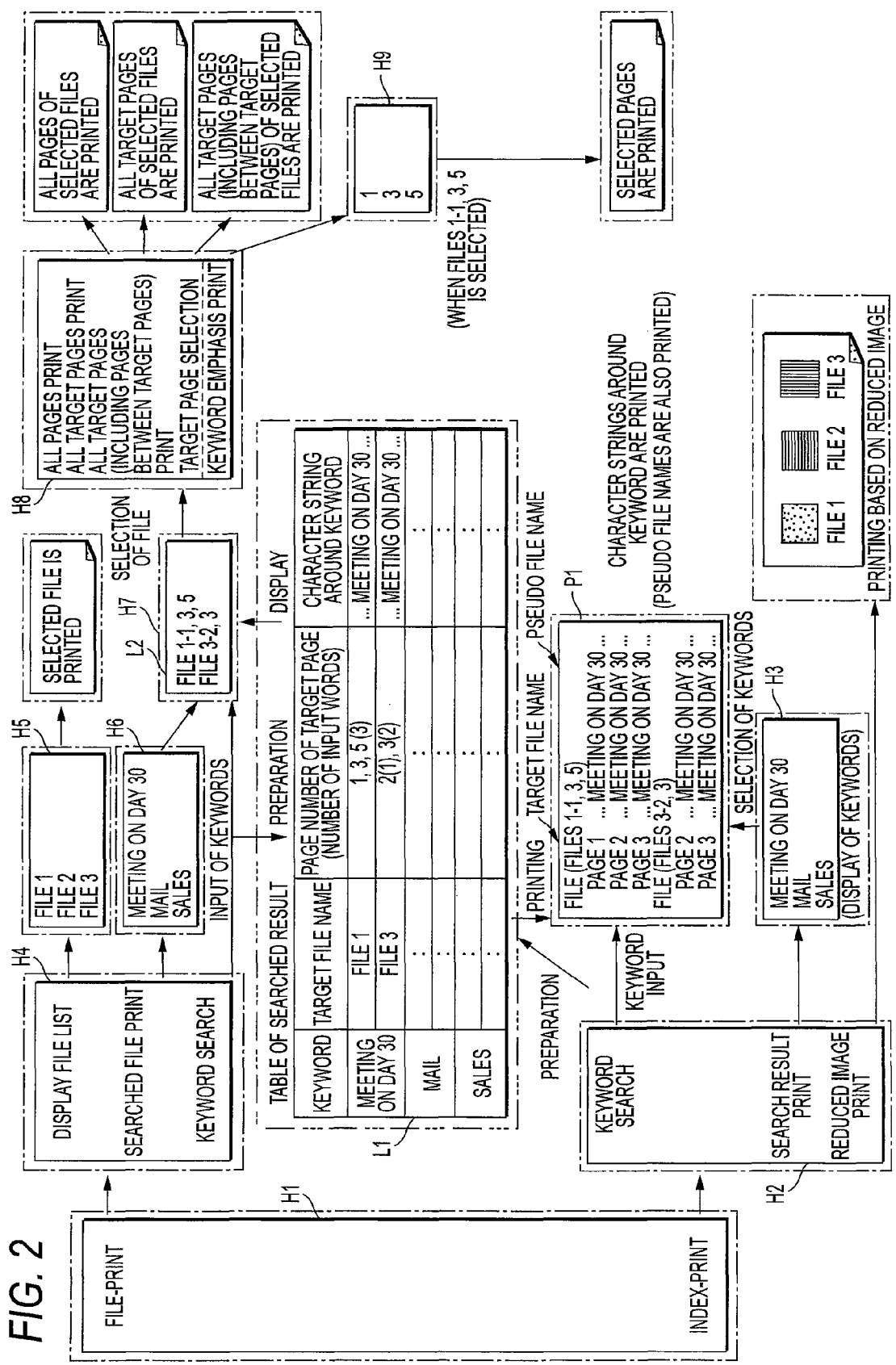
FIG. 2 is a drawing for explaining an overview of functions of the image forming apparatus of FIG. 1 according to an exemplary embodiment.

FIG. 2 is a view for explaining an overview of functions of the image forming apparatus 1 according to an exemplary embodiment of the present invention. In FIG. 2, matters enclosed by single dotted and dashed lines show display states (patterns) of the display panel 4, those enclosed by double dotted and dashed lines show printed matter, and those enclosed by triple dotted and dashed lines show products prepared in the internal storage device 5. It is noted that the matter enclosed by single dotted and dashed lines and the double dotted and dashed line represent concepts (e.g., images), which are different from screens actually displayed or printed.

When the external storage device 20 is connected to the first terminal 6, a display pattern H1 is displayed on the display panel 4. In the display pattern H1, a prompt is provided to select one of a file-print function and an index-print function.

If "index-print" is selected, a display pattern H2 is displayed on the display panel 4. In the display pattern H2, a prompt is provided to select one of three functions: a function for preparing a list based on keyword search and printing (hereinafter referred to as "keyword search"); a function for printing a search result (hereinafter referred to as "search result print"); and a function for printing reduced images (hereinafter referred to as "reduced image print").

If "keyword search" is selected, a message prompting the input of a keyword is displayed on the display panel 4. After the keyword is input, if a start is indicated, for example by pressing a start button (not shown) included in the operation panel 3 or by selecting a "Search Start" displayed on the display panel 4, print files containing the input keyword are searched from among print files stored in the external storage device 20. Then, list data L1 concerning the data found while searching for the input keyword is prepared and stored in the internal storage device 5. It is noted that a print file may comprise content, a file name and attribute information. That is, in the search operation, a print file containing the input keyword in the file name or the attribute information not only in the content may be searched.

It will be appreciated that "keyword" includes a character, a number, a symbol, a word, a sentence made up of a plurality of words, or any of these in combination or in part.

In this exemplary embodiment, if a plurality of keywords are input, a search based on AND conditions is combined with a search based on OR conditions, thereby making it possible to search a print file containing at least one keyword among the plurality of keywords and to conduct a refinement search by conducting the search at plurality of times separately.

It is noted that in this exemplary embodiment, the list data L1 stored in the internal storage device 5 is deleted in response to a delete instruction. When deleting list data L1, one of the two functions may be selected: a function for deleting selected list data L1; and a function for deleting all list files L1 collectively.

The list data L1 comprises a list comprising (1) an input word, (2) a file name of a print file containing the input word (hereinafter, the print file is referred to as a target file), (3) a number of pages of the target file that contain the input word, (4) the number of the input words contained in one page of the target file, and (5) a character string in the target file that contains the input word. It is noted that in this exemplary embodiment, a character string comprising letters within about 10 letters around the input word is listed as the character string containing the input word. It is also noted that if a page of the target file includes a plurality of occurrences of the input word, the character string may comprise one of the plurality of occurrences of the input word.

Upon preparation of the list data L1, an index list P1, which comprises at least (a) a target file name, (b) a pseudo file name and (c) a character string containing an input word as a list item, is prepared for printing based on the prepared list data L1, and the index list P1 is printed. In this exemplary embodiment, the index list P1 is not saved in the internal storage device 5 but prepared at printing time. It is noted that the index list P1 may comprise all information in the list data L1. In other words, the list data L1 may be printed.

It is noted that the pseudo file name is generated by adding the number of pages containing the input word to the file name of a target file. For example, in a case where the file name of the target file is "file 1" and the number of pages containing the input word is page 1, page 3 and page 5, the pseudo file name will be "file 1-1, 3, 5."

In the display pattern H2, if "search result print" is selected, keywords used in the previous keyword search are displayed on the display panel 4 (refer to a display pattern H3), and if any one of the displayed keywords is selected, the previous list data L1 relating to the selected keyword is retrieved from the internal storage device 5. Then, the list data L1 printed out or an index list P1 is prepared based on the list data L1 and printed out.

In the display pattern H2, if "reduced image print" is selected, contents of print files stored in the external storage device 20 (e.g., the first pages of the print files in this exemplary embodiment) are reduced in size and printed out.

In the display pattern H1, if "file-print" is selected, a display pattern H4 is displayed on the display panel 4. In the display pattern H4, any one of three functions may be selected: a function for printing a print file selected from listed file names (hereinafter referred to as "display file list"); a function for printing a print file selected from searched files which were previously subjected to key word search (hereinafter referred to as "searched file print"); and a function for printing a print file based on a search using a new keyword (hereinafter referred to as "keyword search").

If "display file list" is selected, file names of print files stored in the external storage device 20 are displayed on the display panel 4 (refer to the display pattern H5). If a specific file name is selected from listed file names, the selected print file is retrieved from the external storage device 20 and printed out by the printer unit 2.

In the display pattern H4, if "searched file print" is selected, keywords used in previous keyword searches are displayed on the display panel 4 (refer to the display pattern H6). When one of the displayed keywords is selected, the previous list data L1 relating to the selected keyword is read from the internal storage device 5.

List data L2 comprising pseudo file names is newly prepared based on the read list data L1 and displayed on the display panel 4 (refer to the display pattern H7). In this exemplary embodiment, the list data L2 is not saved in the internal storage device 5 but prepared at display time. It is noted that the List data L2 may comprise all information in the list data L1. In other words, the list data L1 as it is may be printed.

In the display pattern H4, if "keyword search" is selected, similarly to the case where "keyword search" is selected in relation to display patter H2 of the "index-print" function described above with respect to display patterns H2 and H1, a message prompting input of a keyword is displayed on the display panel 4. After a keyword is input, if a start is indicated, for example by pressing a start button or others included in the operation panel 3 or by selecting a "Search Start" displayed on the display panel 4, a print file containing the input word (keyword) is searched in the external storage device 20 and list data L1 relating to the searched print file is prepared and stored in the internal storage device 5.

Then, list data L2 is newly prepared based on the newly prepared list data L1, and the prepared list data L2 is displayed on the display panel 4. In this exemplary embodiment, the list data L2 prepared in relation to the "keyword search" function is not saved in the internal storage device 5 but prepared at display time (refer to the display pattern H7).

Thereafter, if a specific pseudo filename is selected from the list data L2, option settings for printing the selected print file (refer to the display pattern H8) are displayed on the display panel 4. At least one of the following five types of option settings may be available as the option settings in this exemplary embodiment.

(1) "All pages print" is a setting for printing all pages in the selected print file.

(2) "All target pages print" is a setting for printing all pages containing an input word in the selected print files.

(3) "All target pages (including pages between the target pages) print" is a setting for printing all pages from a first page containing an input word to a last page containing the input word (including pages between the first page and the last page), if there are more than two pages containing the input word in the selected print files.

(4) "Target page selection" is a setting for printing only a target page which is selected as a page to be printed among pages containing an input word (target pages). If "target page selection" is selected, a page setting screen for selecting the number of pages to be printed (display pattern H9) is displayed on the display panel 4. In this exemplary embodiment, the number of pages to be displayed on the page setting screen can be obtained from the selected pseudo file names. For example, when the selected pseudo file name is "file 1-1, 3, 5", the page number "1" "3" and "5" will be displayed.

(5) "Keyword emphasis print" is a setting for printing an input word in a color or font different from that of words other than the input word when printing is performed based on any one of the other settings.

3. Control flow charts of functions according to an exemplary embodiment of the present invention FIG. 3 to FIG. 6 are flow charts showing an example of controlling the above-described functions of an exemplary embodiment of the present invention. Hereinafter, an explanation will be made for these flow charts.

3.1. Index Printout (Refer to FIG. 3)

Figure 3:
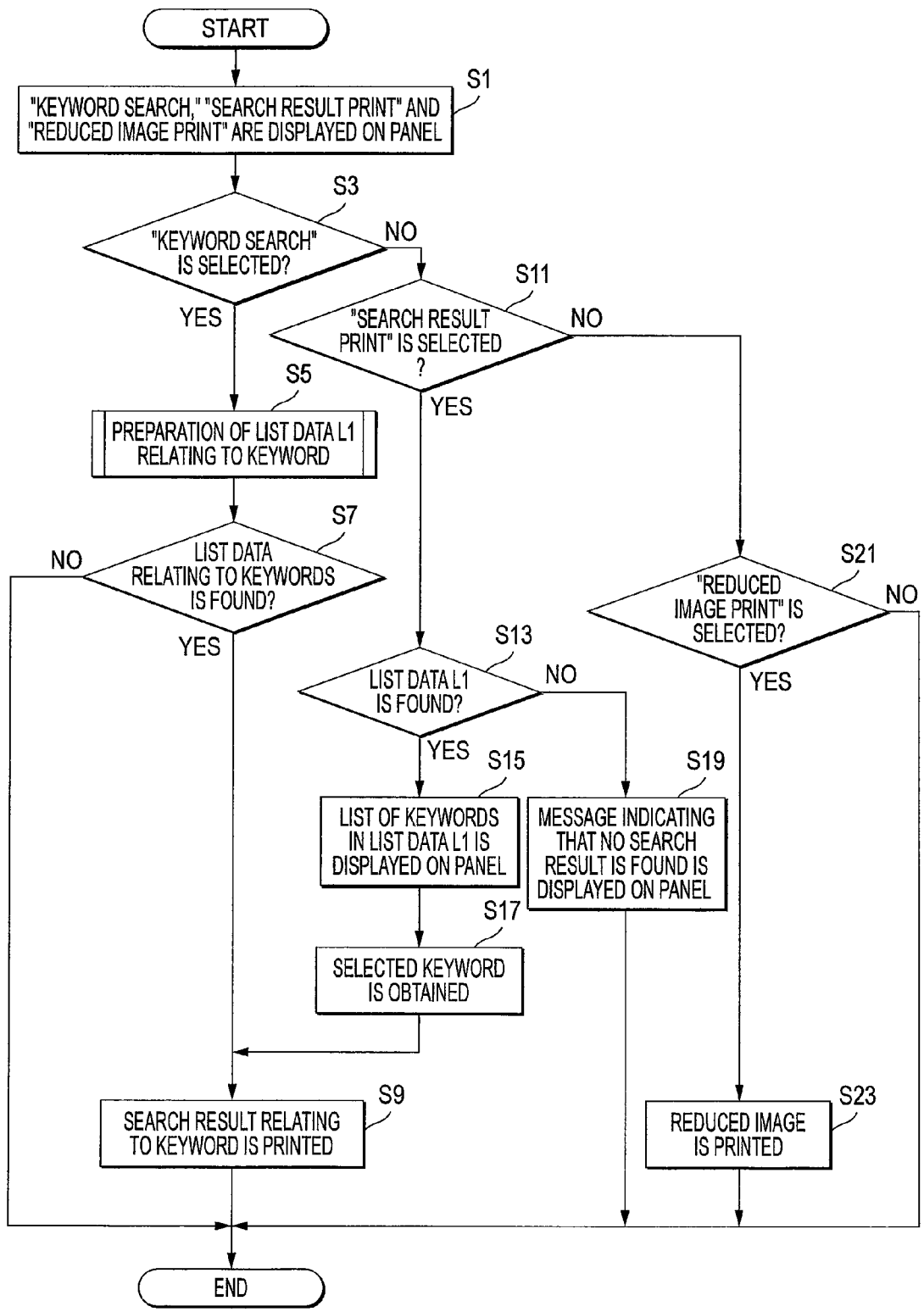
FIG. 3 is a flow chart showing operations used for index-printing.

The flow chart in FIG. 3 shows operations for the "index-print" (refer to FIG. 2) function according to an exemplary embodiment of the present invention. Upon selection of the index-print function, "keyword search", "search result print" and "reduced image print" are displayed at operation S1.

It is determined whether "keyword search" is selected at operation S3. If it is determined that "keyword search" is selected (S3: YES), operations for preparing list data L1 relating to an input keyword (input word) is performed at operation S5. The operations for preparing list data L1 will be explained in more detail below. It is determined if a print file containing the input word exists at operation S7 and the list data L1 is prepared.

If it is determined that a print file containing the input word exists and the list data L1 is prepared (S7: YES), the search result (i.e., the index list P1) is printed out at operation S9 and the process ends. On the other hand, if it is determined that no print file containing the input word exists and no list data L1 is prepared (S7: NO), the processing ends since no print file containing the input keyword is saved in the external storage device 20.

If, at operation S3, it is determined that "keyword search" is not selected (S3: NO), it is determined whether "search result print" is selected at operation S11. If it is determined that "search result print" is selected (S11: YES), it is determined whether list data L1 is found in the internal storage device 5 at operation S13.

If it is determined that the list data L1 is found in the internal storage device 5 (S13: YES), a list of keywords contained in the list data L1 is displayed on the display panel 4 at operation S15. A keyword which is selected from the displayed list of keywords is obtained at operation S17, and list data L1 relating to the selected keyword is retrieved from the internal storage device 5 and printed out at operation S9. On the other hand, if it is determined that no list data L1 exists in the internal storage device 5 (S13: NO), a message indicating that no search result has been found is displayed on the display panel 4 at operation S19 and processing ends.

If, at operation S11, it is determined that "search result print" is not selected (S11: NO), it is determined whether "reduced image print" is selected at operation S21. If it is determined that "reduced image print" is selected (S21: YES), the contents of print files (e.g., the first pages of the print files in this exemplary embodiment) is reduced in size and printed out at operation S23 and processing ends. If it is determined that "reduced image print" is not selected (S21: NO), processing ends.

3.2. Operation for Preparing List Data Relating to Keywords (Refer to FIG. 4)

Figure 4:
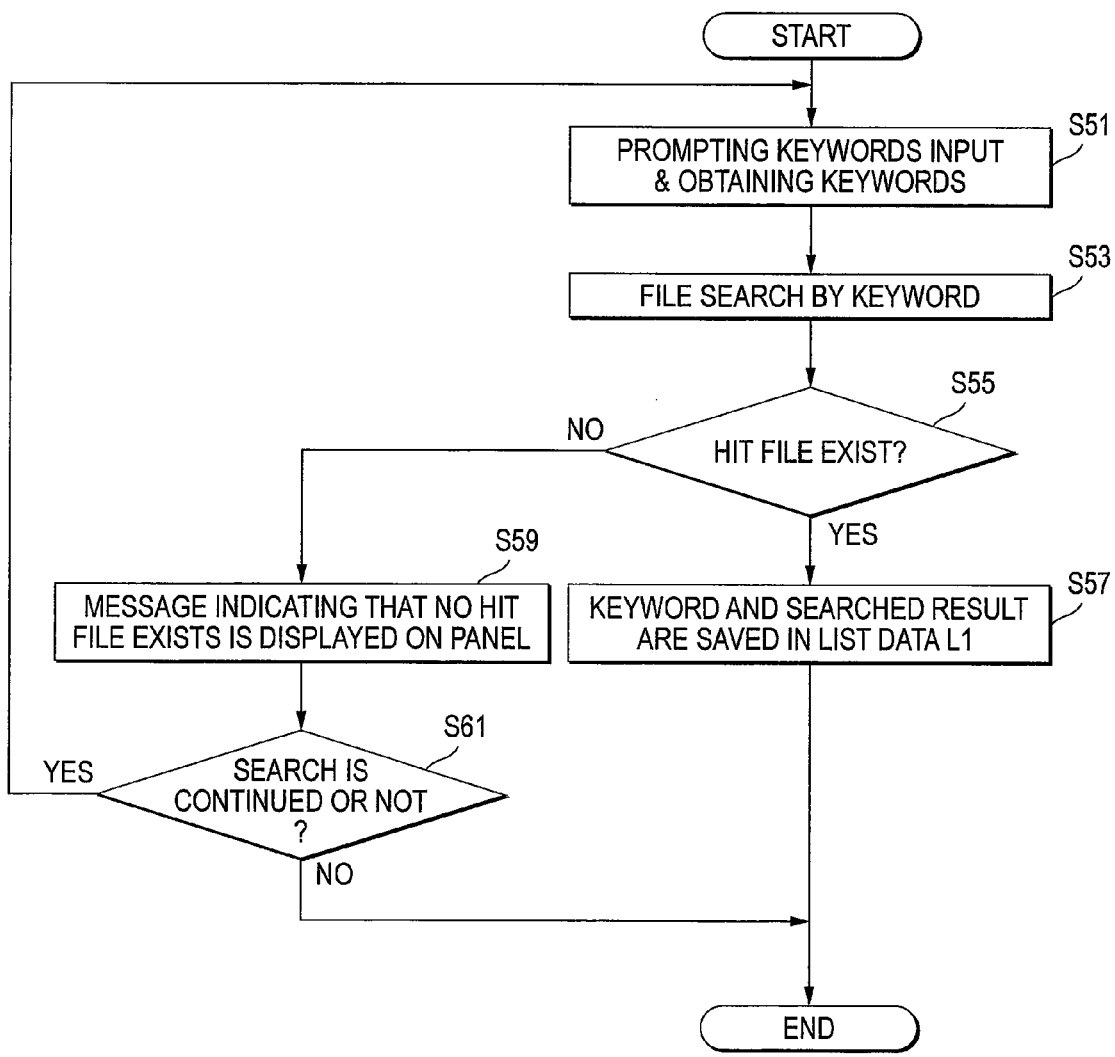
FIG. 4 is a flow chart showing the operations of FIG. 3 in more detail.

FIG. 4 is a flowchart showing operations for preparing list data relating to keywords in more detail. These are the operations associated with operation S5 of FIG. 3. A message prompting input of a keyword or keywords is displayed on the display panel 4, and a keyword is obtained at operation S51. Data stored in the external device is searched, according to the keyword input in operation S51 at operation S53.

It is determined whether a print file containing the input word (i.e., a target file) exists in the external storage device in operation S55. If it is determined that a target file exists (S55: YES), list data L1 relating to the input word and relating to the searched target file is prepared and saved in the internal storage device 5 at operation S57.

On the other hand, if it is determined that no data containing the input word exists (i.e., no target file is found) (S55: NO), a message indicating that no target file has been found is displayed on the display panel 4 at operation S59. A message inquiring whether to continue the keyword search is displayed on the display panel 4 and is determined whether to continue the keyword search at operation S61.

If it is determined to continue the keyword search (S61: NO), processing ends. On the other hand, if it is determined to continue the keyword search (S61: YES), the processing returns to operation S51.

3.3. File Print (Refer to FIG. 5)

Figure 5:
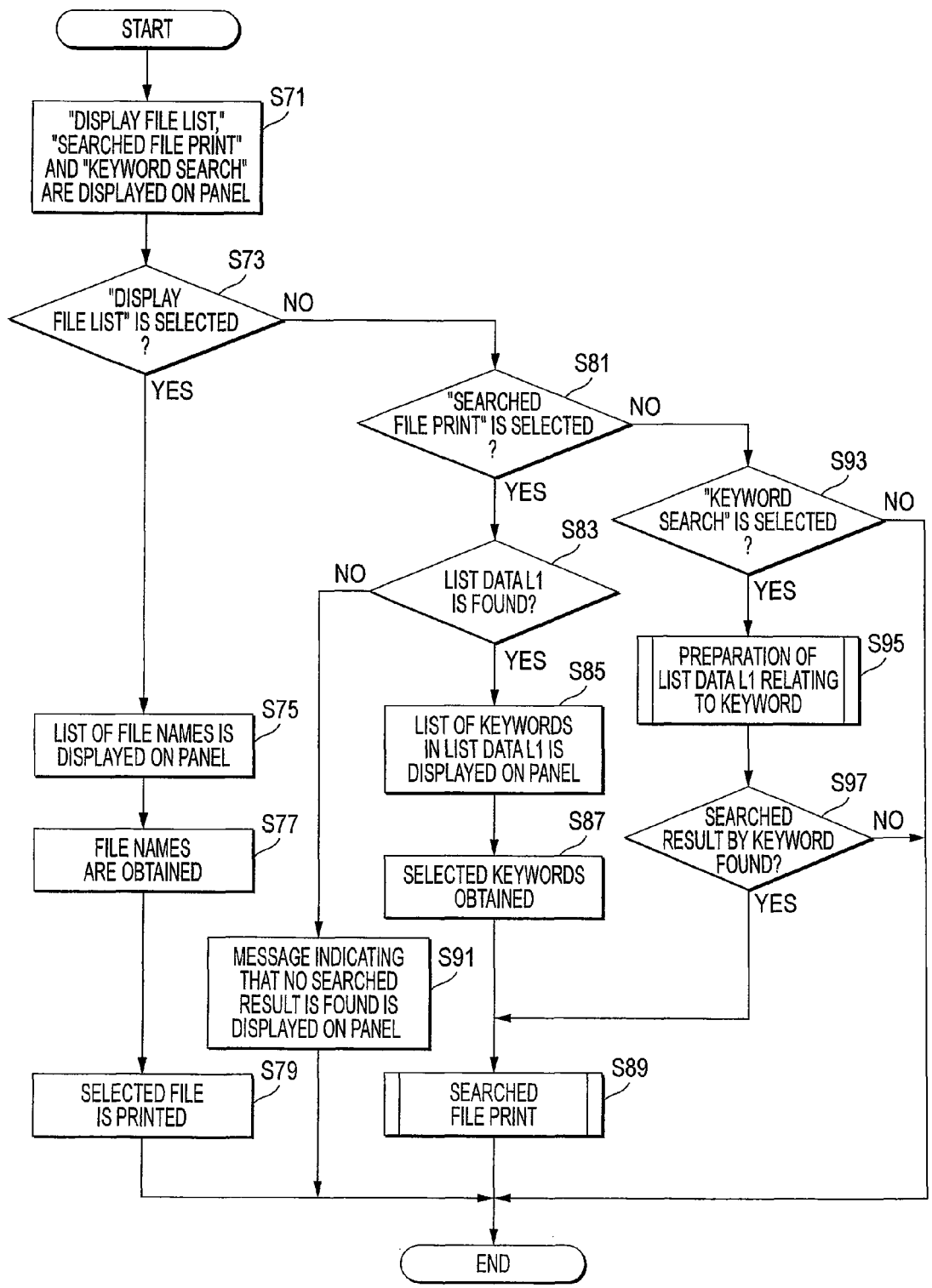
FIG. 5 is a flow chart showing file-print operations.

FIG. 5 is a flow chart showing operations for the "file-print" function according to an exemplary embodiment of the present invention. Upon selection of the "file-print" function, "display file list", "searched file print" and "new keyword" are displayed at operation S71.

It is determined whether "display file list" is selected at operation S73. If it is determined that "display file list" is selected (S73: YES), file names of print files stored in the external storage device 20 are displayed in a list on the display panel 4 at operation S75. A file name is selected from the listed file names is obtained at operation S77, and a print file having the selected file name is retrieved from the external storage device 20 into the image forming apparatus 1 and printed out at operation S79.

If it is determined that "display file list" is not selected, (S73: NO), it is determined whether "searched-file print" is selected at operation S81. If it is determined that the "searched-file print" is selected (S81: YES), it is determined whether list data L1 exists in the internal storage device 5 at operation S83.

If it is determined that list data L1 exists in the internal storage device 5 (S83: YES), a list of keywords contained in the list data L1 is displayed on the display panel 4 at operation S85. A key word from the displayed list of keywords is obtained at operation S87, and the list data L1 relating to the obtained keyword is retrieved from the internal storage device 5 and searched-file print operations are performed at operation S89. The searched-file print operation will be more detail below.

On the other hand, if it is determined that no list data L1 exists in the internal storage device 5 (S83: NO), a message indicating that no search result is found in the list data L1 is displayed on the display panel 4 at operation S91, and processing ends.

If it is determined that "searched file print" is not selected (S81: NO), it is determined whether "keyword search" is selected at operation S93. If it is determined that "keyword search" is selected (S93: YES), processing for preparing list data L1 according to keywords is executed similar to the operations associated with operation S5 described above in operation S95, and it is determined whether a file data containing the input word (keyword) as the result of the keyword search is obtained and list data L1 is prepared at operation S97. The details of operation S95 are similar to those of S5 (see FIG. 4) described above, and will be omitted here.

If it is determined that file data containing the input word as the result of keyword search is obtained and the list data L1 is prepared (S97: YES), the searched-file print operations are performed at operation S89, and processing ends. On the other hand, if it is determined that no print file data containing the input keyword as the result of the keyword search is obtained and list data L1 relating to the input words is not prepared (S97: NO), processing ends.

3.4. Searched-File Print Operations (Refer to FIG. 6)

Figure 6:
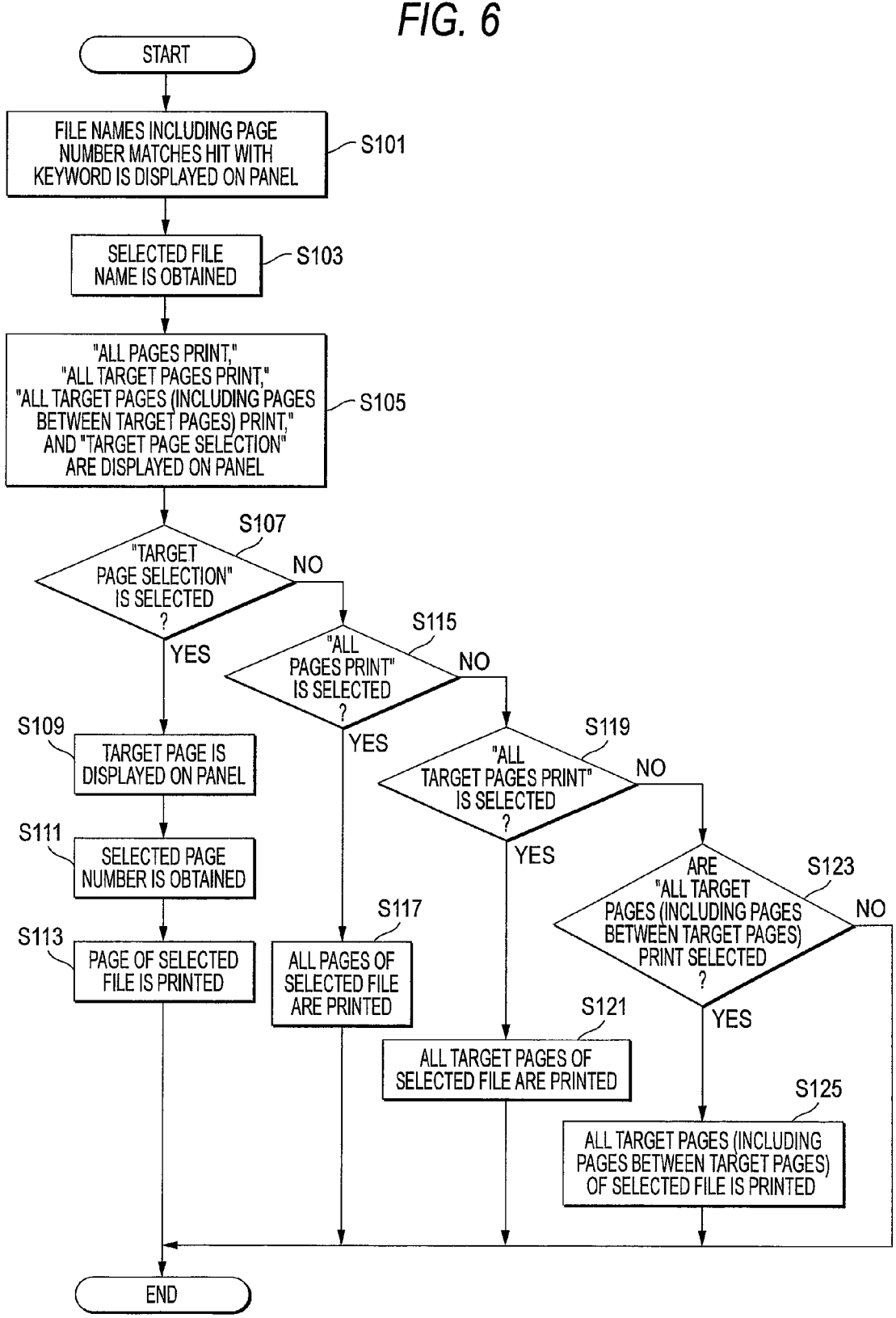
FIG. 6 is a flow chart showing searched-file print operations in detail.

FIG. 6 is a flow chart showing searched-file print operations in more detail. These are the operations associated with operation S89 in FIG. 5. List data L2 comprising pseudo file names is prepared based on the input word and list data L1, and the prepared list data L2 is displayed on the display panel 4 at operation S101.

A selected pseudo file name is obtained at operation S103. After the selected pseudo file name is obtained, option settings for printing a print file (refer to display pattern H8) are displayed on the display panel 4 at operation S105.

It is determined whether "target page selection" is selected at operation S107. If it is determined that the "target page selection" is selected (S107: YES), a page setting screen (i.e., display pattern H9; see FIG. 2) is displayed on the display panel 4 at operation S109, and a number of target pages to be printed among target pages containing the input word, based on list data L1 relating to the pseudo file name, is selected at operation S111.

In the retrieved target file, a target page having the page number obtained at operation S111 is printed at operation S113, and processing ends.

If it is determined that "target page selection" is not selected (S107: NO), it is determined whether "all pages print" is selected at operation S115. If it is determined that the "all pages print" is selected (S115: YES), a target file is retrieved from the external storage device 20 into the image forming apparatus 1, based on the list data L1 relating to the pseudo file name obtained at S103 and all pages of the retrieved target file are printed at operation S117.

If it is determined that "all pages print" is not selected (S115: NO), it is determined whether "all target pages print" is selected at operation S119. If it is determined that the "all target pages print" is selected (S119: YES), a target file is retrieved from the external storage device 20 into the image forming apparatus 1, based on the list data L1 relating to the pseudo file name obtained at S103, and all pages containing the input word in the retrieved target files are printed at operation S121, and processing ends.

If it is determined that "all target pages print" is not selected (S119: NO), it is determined whether "all target pages (including pages between the target pages) print" is selected at operation S123. If it is determined that "all target pages (including pages between the target pages) print" is selected (S123: YES), a target file is retrieved from the external storage device 20 into the image forming apparatus 1, based on the list data L1 relating to the pseudo file name obtained at S103, and pages from a first page containing the input word to a last page containing the input word in the retrieved target file are printed at operation S125, and processing ends. On the other hand, if it is determined that "all target pages (including pages between the target pages) print" is not selected (S123: NO), processing ends.

If "keyword emphasis print" (refer to display pattern H8) is selected to set the keyword emphasis print, the input word is printed in a color different from that of words other than the input word at operation S113, operation S117, operation S121 and operation S125.

4. Effect of the Exemplary Embodiment

In the exemplary embodiment of the present invention described above, since a print file containing an input word received by the display panel 4 is searched, and then, list data L1 relating to the searched print file is prepared, it becomes possible to print or display the list data L1 or information prepared based on the list data L1.

Therefore, it is possible to grasp an overview of the searched print files based on the list data L1, and it becomes possible to prevent recording media from being wastefully consumed. In this exemplary embodiment, when a plurality of keywords (words) are input, a print file containing at least one word of these plurality of words can be searched to prepare the list data L1, thereby the overview of the print files can be more easily grasped and the usability of the search function improves.

Further, in this exemplary embodiment, since the list data L1 is stored in the internal storage device 5, it is possible to reuse the list data L1 prepared in a previous search and the usability of the search function improves.

Still further, in addition to the function of printing an index list P1 based on the list data L1, since the list data L1 is displayed on the display panel 4 in this exemplary embodiment, it becomes possible to grasp the overview of print files without printing the list data L1. Therefore, it becomes possible to grasp the overview of print files based on the list data L1, with recording media prevented from being consumed much.

In this exemplary embodiment, print files matching search conditions and those stored in an external storage device 20 can be printed directly without use of a computer or other device. Therefore, it becomes possible to improve the usability of the image forming apparatus 1.

Further, in this exemplary embodiment, option settings for printing a print file (refer to display pattern H8) can be selected. Therefore, it becomes possible to improve the usability of the image forming apparatus 1.

Further, in this exemplary embodiment, a page containing an input word among print files can be printed. Therefore, it becomes possible to improve the usability of the image forming apparatus 1.

Still further, in this exemplary embodiment, a page containing an input word and pages between pages containing the input words in the print file can be printed. Therefore, it becomes possible to improve the usability.

In addition, in this exemplary embodiment, on printing a page containing at least one input word, the input word can be printed in a color different from that of words other than the input words. Therefore, it is possible to find easily the input word within the printed data.

Other Embodiments

The present invention is not limited to exemplary embodiments described above with reference to the accompanying drawings.

Though print files stored in the external storage device 20 are set as a search range in the above exemplary embodiment, the present invention shall not be limited thereto. According to another exemplary embodiment of the present invention, print files stored in the internal storage device 5 may be set as the search range. Moreover, according to yet another exemplary embodiment of the present invention, the search range may be set to include a combination of the external storage device 20 and the internal storage device 5, or a plurality of external storage devices either alone or in combination with the internal storage device 5.

Though a pseudo file name is prepared at printing time in the above exemplary embodiment, the present invention shall not be limited thereto. According to another exemplary embodiment, the pseudo file name may be stored in the internal storage device 5 with the list data L1.

Though the list data L1 and the input word are stored in the internal storage device 5 in the above exemplary embodiment, the present invention shall not be limited thereto. According to another exemplary embodiment, the list data L1 and the input keyword may be prepared at printing time.

Though list items including character strings composed of letters within a plurality of letters around the input word are stored in the internal storage device 5 in the above exemplary embodiment, the present invention shall not be limited thereto. According to another exemplary embodiment, the list items may be searched and obtained, whenever necessary.

In the above exemplary embodiment, if a print file containing an input word is found by search, the input word (keyword) is stored in the internal storage device 5. However, the present invention shall not be limited thereto. All the input words may be stored in the internal storage device 5.

If an input word which is not found in a target file is displayed in the "search result print" function or others, it is advantageous that the input word is displayed in a color different from that of other input words which are found in the target files so that that the input keywords may be more easily distinguished.

Further, in the above exemplary embodiment, the list data L1 is deleted from the internal storage device 5 according to an instruction. However, the present invention shall not be limited thereto. For example, the list data L1 may be deleted from the internal storage device 5 when the external storage device 20 is disconnected from the first terminal 6.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image forming apparatus comprising:
an input receiving unit configured to receive a keyword;
a preparation unit configured to prepare list data relating to a print file containing the received keyword among a plurality of print files stored in a storage unit; and
a printing unit configured to print a list based on the list data,
wherein the list data comprises a string of characters comprising at least the received keyword from the print file containing the received keyword,
wherein, if a page of the print file containing the received keyword includes a plurality of occurrences of the keyword, the list data comprises a string of characters comprising one of the plurality of occurrences of the received keyword,
wherein the list data comprises a number of occurrences of the keyword included in one page of the print file, and
wherein the printing unit prints the list so as to include the received keyword.

2. The image forming apparatus according to claim 1, further comprising a terminal to which the storage unit is removably coupled.

3. The image forming apparatus according to claim 1, wherein the input receiving unit receives a plurality of keywords, and
wherein the preparation unit prepares the list data relating to a print file containing at least one of the plurality of received keywords.

4. The image forming apparatus according to claim 1, wherein the list data comprises a page number of the print file on which the keyword is found.

5. The image forming apparatus according to claim 1, further comprising a list storage unit configured to store the list data.

6. The image forming apparatus according to claim 1, further comprising a display configured to display the list data.

7. The image forming apparatus according to claim 1, wherein the list data relates to a plurality of files, each of which containing the received keyword.

8. An image forming apparatus comprising:
   an input receiving unit configured to receive an input keyword;
   a controller configured to prepare list data relating to a print file containing the input keyword among a plurality of print files stored in a storage unit; and
   a printing unit that prints a list based on the list data,
   wherein the list data comprises a string of characters comprising at least the received keyword from the print file containing the received keyword,
   wherein, if a page of the print file containing the received keyword includes a plurality of occurrences of the keyword, the list data comprises a string of characters comprising one of the plurality of occurrences of the received keyword,
   wherein the list data comprises a number of occurrences of the keyword included in one page of the print file, and
   wherein the printing unit prints the list so as to include the received keyword.

\* \* \* \* \*